Figure 1:
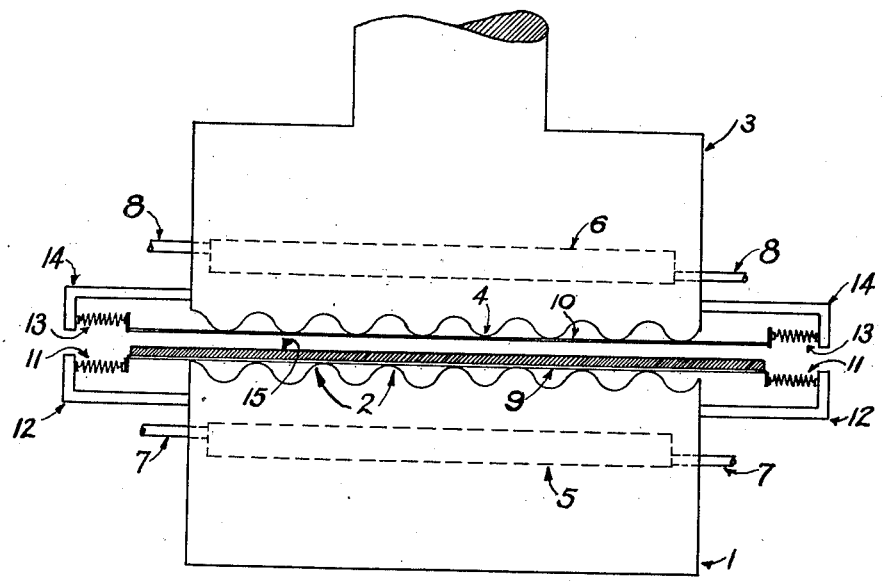

June 1, 1926.

F. W. ADAMS ET AL 1,587,462

PROCESS AND APPARATUS FOR CRIMPING PLASTIC MATERIAL

Filed Nov. 4, 1919

INVENTORS
Floyd W. Adams
Kenneth B. Howell
BY
Chas. W. Mortimer
ATTORNEY

Patented June 1, 1926.

1,587,462

UNITED STATES PATENT OFFICE.

FLOYD W. ADAMS, OF HUDSON HEIGHTS, AND KENNETH B. HOWELL, OF EAST ORANGE, NEW JERSEY, ASSIGNORS TO THE BARRETT COMPANY, A CORPORATION OF NEW JERSEY.

PROCESS AND APPARATUS FOR CRIMPING PLASTIC MATERIAL.

Application filed November 4, 1919. Serial No. 335,564.

This invention relates to a process and apparatus for forming irregularities, protuberances or projections such as ribs, corrugations, or raised or depressed portions upon or into the surface of bodies or sheets of flexible or plastic materials which have a tendency to crack when distorted beyond a certain amount. The invention is applicable to a large variety of materials of this nature, and contemplates the formation of the materials into a great variety of shapes without objectionable cracking or disruption of the particles and consequent injury to the articles that are formed from the materials. The invention is particularly adapted, though it is not all restricted to, the corrugation of sheets of such a nature that they would ordinarily be injured when it is attempted to corrugate the same by pressing them in a press. This is especially true of sheets which have small tensile strength or a small degree of elasticity, such, for example, as sheets of roofing material, wall boards, etc.

This invention is also applicable to articles made of materials of different sorts which are covered on one or both sides with a layer or sheet of material which can not be stretched or extended a great deal without injury or objectional results.

In one of its aspects the invention may be regarded as a process by which the surface of articles may be distorted by a pressing or similar operation while the body of the material is moved laterally towards the distorted part to compensate for the difference between the surface areas before and after the distorting operation which formed the irregularities has taken place. As applied to the corrugation of sheets the body of the material is moved laterally to compensate for the difference between the straight line distances between corrugations and the corresponding curved distances measured along the outline of the corrugations.

In another aspect the invention will be seen to be a process by which articles consisting of certain materials may be bent, distorted, or some of their physical characteristics such as density, flexibility, etc., may be altered during or subsequent to the distorting operation. This operation may be performed with the aid of heat, either during the operation which forms the corrugations, etc., or following such operation.

It is well known that when it is attempted to corrugate flat sheets that are stiff, or weak in tensile strength, or non-elastic, by pressing them between the corrugated faces of a press there is always danger of breaking the sheets as the corrugated plates of the press come together and match unless provision is made for causing the sheets to slide over the corrugations to relieve the strain which would otherwise be caused by the sheets being made to follow the undulations. This danger is obviated by this invention in that positive means are provided for causing the sheets to slide the proper amount in accordance with the depths of the corrugations. For the purpose of clearly explaining the invention it will be more particularly described in connection with the corrugation of flat sheets of material though it is equally applicable to the reshaping of articles of various forms where it is desired to bend or distort portions of their surfaces without injury.

Figure 2:
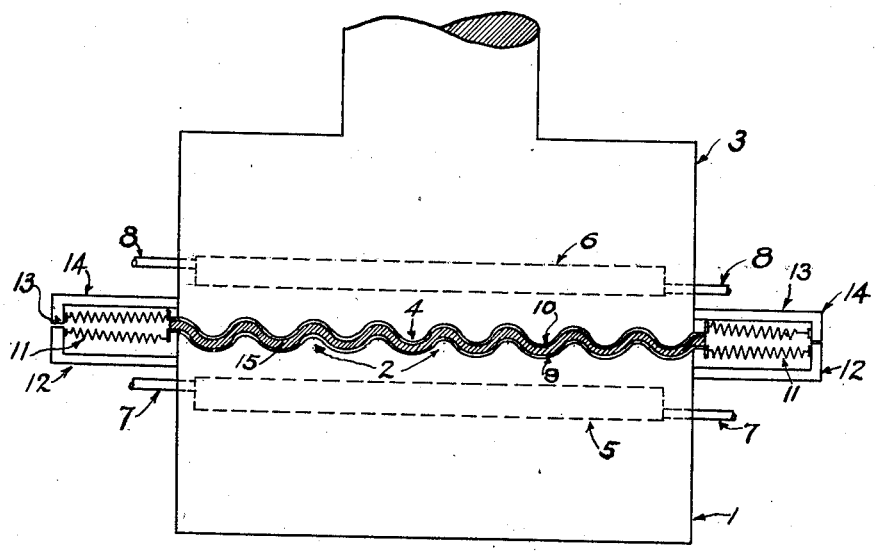

One embodiment of the invention will be understood from the following description and the accompanying drawings which illustrate one embodiment thereof, in which, Fig. 1 represents a side view of the press ready to operate, and Fig. 2 represents a corresponding view showing the pressing operation.

In the drawings, reference character 1 represents the base of a hydraulic or similar press having corrugations 2 along the upper face thereof. The other member of the press is shown at 3 having corrugations 4 corresponding to and matching with the corrugations 2 in the base 1. The base 1 and member 3 may be provided with means by which the corrugations 2 and 4 may be heated. As illustrated, this heating means consists of hollow spaces 5 and 6 into which are introduced suitable heating mediums, such as steam, through the pipes 7 and 8, respectively. Other means, such, for example, as an electrical heater may obviously be used to keep the corrugations 2 and 4 at the desired temperature.

Reference characters 9 and 10 represent thin flexible sheets of material of great tensile strength which are placed in contact with the corrugations 2 and 4. The edges of the sheet 9 may be connected by tensile springs 11 to the projections 12. In a similar manner the sheet 10 may be connected by springs 13 to the projections 14. The thin sheets 9 and 10 are preferably made of resilient metal, such as tempered steel, so that they can be easily bent to follow the corrugations 2 and 4 and so that they will readily resume their normal shapes when the pressure is relieved. The sheets 9 and 10 may, however, be made of woven wire as the pull of the springs will aid in straightening them out.

The operation is as follows: The upper member 3 of the press is separated the proper distance from the base 1 with the flat plates 9 and 10 resting against the corrugations 2 and 4 as shown in Fig. 1. The sheet 15 which is to be corrugated is then laid upon the flat plate 9 and the member 3 and base 1 are caused to approach. As the corrugations 4 enter between the corrugations 2 the flat plates 9 and 10, enclosing the sheet 15, are pulled inwardly from both sides thus carrying the sheet 15 and relieving the strain which would otherwise be produced in the sheet 15 due to its being pressed between the corrugations.

When the sheet 15 is made of fibrous material through which is distributed comminuted bituminous or waterproofing material in solid form, it is desirable to have the corrugations 2 and 4 hot so that the bituminous material will become liquid and thereby saturate the sheet, while the pressure densifies the same. The sheet 15 may be cooled or set in any suitable way so as to cause it to retain its shape after the pressure is relieved. When the pressure is relieved the sheet 15 is removed, the plates 9 and 10 resume their normal shape, and another sheet is inserted to be corrugated.

Similarly, if the sheet is covered on one or both sides with a thin layer of material, such as asbestos, which would tend to crack and leave open or exposed spaces due to bending, the sheets of resilient metal will effectively cause the thin layer so to move that no broken or cracked portions will appear.

It is obvious that the invention is applicable to the formation of ribs or grooves and projections or indentations of various shapes on or in articles or bodies that are susceptible of such treatment. The interposition of the thin sheet of resilient material between the presser face and the body of material being treated so that the sheet may follow the irregularities as they are formed, prevents the tearing action of the presser face which would otherwise occur due to relative motion between certain portions of the surface of the material being treated and the presser face if the thin sheet were omitted. That is, the interposed sheet substantially follows and remains in contact with the surface of the articles as they are being reshaped, while there is relative motion between the thin sheet and the presser face thereby relieving the tendency of the presser face to tear or injure the articles.

We claim:

1. In a press, a pair of pressure members having corrugations on their faces and a thin flat plate of metal disposed along said corrugations.

2. In the process of corrugating a sheet of material, the steps which comprise laying a thin plate of resilient material on said sheet, maintaining said plate in intimate, non-sliding contact with said sheet while said sheet is being corrugated, corrugating said sheet and then removing said plate from said sheet.

In testimony whereof we affix our signatures.

FLOYD W. ADAMS.
KENNETH B. HOWELL.